United States Patent
Challinor

(10) Patent No.: US 11,602,691 B2
(45) Date of Patent: Mar. 14, 2023

(54) TECHNIQUES FOR VIRTUAL REALITY BOUNDARIES AND RELATED SYSTEMS AND METHODS

(71) Applicant: Harmonix Music Systems, Inc., Boston, MA (US)

(72) Inventor: Ryan William Challinor, Cambridge, MA (US)

(73) Assignee: Harmonix Music Systems, Inc., Boston, MA (US)

( * ) Notice: Subject to any disclaimer, the term of this patent is extended or adjusted under 35 U.S.C. 154(b) by 0 days.

(21) Appl. No.: 17/198,513

(22) Filed: Mar. 11, 2021

(65) Prior Publication Data

US 2021/0283503 A1    Sep. 16, 2021

Related U.S. Application Data

(60) Provisional application No. 62/989,468, filed on Mar. 13, 2020.

(51) Int. Cl.
*A63F 13/537* (2014.01)
*A63F 13/65* (2014.01)
(Continued)

(52) U.S. Cl.
CPC .......... *A63F 13/537* (2014.09); *A63F 13/211* (2014.09); *A63F 13/212* (2014.09);
(Continued)

(58) Field of Classification Search
CPC ............ A63F 2300/8082; A63F 13/211; A63F 13/212; A63F 13/537; A63F 13/65;
(Continued)

(56) References Cited

U.S. PATENT DOCUMENTS

| 5,900,849 A | * | 5/1999 | Gallery | ................ G02B 27/017 345/7 |
| 7,330,197 B2 | * | 2/2008 | Kobayashi | ................ G06T 7/74 345/633 |

(Continued)

FOREIGN PATENT DOCUMENTS

GB    2524269 A    9/2015

OTHER PUBLICATIONS

International Search Report and Written Opinion for International Application No. PCT/US2021/021856 dated May 28, 2021.

*Primary Examiner* — Steve Rowland
(74) *Attorney, Agent, or Firm* — Wolf, Greenfield & Sacks, P.C.

(57) ABSTRACT

Described herein are techniques for providing an in-game virtual boundary. First data is received that is indicative of a user position while the user is playing a video game. It is determined whether the user position is within a warning zone, wherein the warning zone comprises an area between a soft boundary indicative of a safe area for the user and a safe boundary indicative of one or more real-world objects around the user. Based on a relationship between the user position and the safe boundary, a visual indication of a
(Continued)

plurality of visual indications of the in-game virtual boundary is determined to provide to the user. Second data indicative of the visual indication is transmitted to a display being viewed by the user while playing the video game.

20 Claims, 11 Drawing Sheets

(51) Int. Cl.
  *A63F 13/211* (2014.01)
  *A63F 13/212* (2014.01)
(52) U.S. Cl.
  CPC ........ *A63F 13/65* (2014.09); *A63F 2300/105* (2013.01); *A63F 2300/1012* (2013.01); *A63F 2300/303* (2013.01); *A63F 2300/6653* (2013.01); *A63F 2300/69* (2013.01); *A63F 2300/8082* (2013.01)
(58) Field of Classification Search
  CPC ........ A63F 2300/1012; A63F 2300/105; A63F 2300/303; A63F 2300/6653; A63F 2300/69
  See application file for complete search history.

(56) References Cited

U.S. PATENT DOCUMENTS

| | | | |
|---|---|---|---|
| 10,901,215 B1* | 1/2021 | Newcombe | G02B 27/0172 |
| 2012/0068913 A1* | 3/2012 | Bar-Zeev | G02B 26/026 |
| | | | 345/8 |
| 2013/0328927 A1* | 12/2013 | Mount | A63F 13/25 |
| | | | 345/633 |
| 2015/0046296 A1* | 2/2015 | Hart | G06Q 30/0242 |
| | | | 705/27.2 |
| 2016/0035246 A1* | 2/2016 | Curtis | H04L 67/10 |
| | | | 340/815.4 |
| 2016/0171771 A1* | 6/2016 | Pedrotti | G06F 3/002 |
| | | | 345/633 |
| 2016/0313790 A1* | 10/2016 | Clement | G02B 27/0093 |
| 2018/0136716 A1* | 5/2018 | Kuehne | G06F 3/012 |
| 2018/0333643 A1* | 11/2018 | Luisi | A63F 13/26 |
| 2018/0373412 A1 | 12/2018 | Reif | |
| 2020/0020157 A1* | 1/2020 | Powers | G06T 19/006 |
| 2020/0134895 A1* | 4/2020 | Pollard | G06T 11/001 |
| 2020/0394841 A1* | 12/2020 | Kaino | G06T 7/50 |
| 2021/0183135 A1* | 6/2021 | Lin | G06T 15/04 |
| 2021/0209919 A1* | 7/2021 | Clark | G08B 21/0261 |
| 2021/0233311 A1* | 7/2021 | Ichim | G06V 20/20 |
| 2021/0233312 A1* | 7/2021 | Noris | G06T 19/006 |

* cited by examiner

TECHNIQUES FOR VIRTUAL REALITY BOUNDARIES AND RELATED SYSTEMS AND METHODS

CROSS-REFERENCE TO RELATED APPLICATIONS

This application claims the benefit under 35 U.S.C. 119(e) of U.S. Provisional Patent Application No. 62/989,468, titled "TECHNIQUES FOR VIRTUAL REALITY BOUNDARIES AND RELATED SYSTEMS AND METHODS," filed Mar. 13, 2020, which is incorporated by reference herein in its entirety.

BACKGROUND

Over the years, various video game platforms have been developed that provide users with a myriad of game play environments. Such environments range from the more traditional environments with two-dimensional displays (e.g., personal computers, laptops, and gaming consoles that connect to a television display) to more recent platforms that provide three-dimensional, augmented reality, and virtual reality (VR) experiences. To interact with video game platforms, users typically use one or more input devices, such as a keyboard and mouse, wired and/or wireless controllers, as well as spatially tracked controllers.

Some video games require a user to perform various physical movements in place, such as walking, running, jumping, and/or the like, including for virtual reality experiences. However, such physical movements can cause a user to unintentionally bump into real world objects during the experience.

SUMMARY

Described herein are techniques for providing a virtual in-game boundary that can provide varying levels of visual warning to a user based on a user's tracked position. In some embodiments, the varying levels of visual warning are determined based on how close the user's tracked position is to a virtual representation of real-world objects around the user during game play. In some embodiments, as the user's tracked position enters a virtual warning zone, an in-game virtual boundary can be displayed and/or modified over time as the user's tracked position changes to reflect the degree of varying proximity of the user's tracked position within the warning zone. In some embodiments, when the user's tracked position moves outside of the warning zone (and therefore outside of a safe zone), enhanced warnings and/or further warnings can be provided to the user. In some embodiments, one or more reference objects can be displayed to the user during game play regardless of whether the user's tracked position is within the warning zone (e.g., in order to provide a frame of reference during game play).

According to one aspect, a computer-implemented method provides an in-game virtual boundary. The method includes: receiving first data indicative of a user position while the user is playing a video game; determining whether the user position is within a warning zone, wherein the warning zone comprises an area between: a soft boundary indicative of a safe area for the user; and a safe boundary indicative of one or more real-world objects around the user; determining, based on a relationship between the user position and the safe boundary, a visual indication of a plurality of visual indications of the in-game virtual boundary to provide to the user; and transmitting second data indicative of the visual indication to a display being viewed by the user while playing the video game.

According to one aspect, a non-transitory computer-readable media is provided that includes instructions that, when executed by one or more processors on a computing device, are operable to cause the one or more processors to perform: receiving first data indicative of a user position while the user is playing a video game; determining whether the user position is within a warning zone, wherein the warning zone comprises an area between: a soft boundary indicative of a safe area for the user; and a safe boundary indicative of one or more real-world objects around the user; determining, based on a relationship between the user position and the safe boundary, a visual indication of a plurality of visual indications of the in-game virtual boundary to provide to the user; and transmitting second data indicative of the visual indication to a display being viewed by the user while playing the video game.

According to one aspect, a system is provided comprising a memory storing instructions, and one or more processors configured to execute the instructions to perform: receiving first data indicative of a user position while the user is playing a video game; determining whether the user position is within a warning zone, wherein the warning zone comprises an area between: a soft boundary indicative of a safe area for the user; and a safe boundary indicative of one or more real-world objects around the user; determining, based on a relationship between the user position and the safe boundary, a visual indication of a plurality of visual indications of the in-game virtual boundary to provide to the user; and transmitting second data indicative of the visual indication to a display being viewed by the user while playing the video game.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
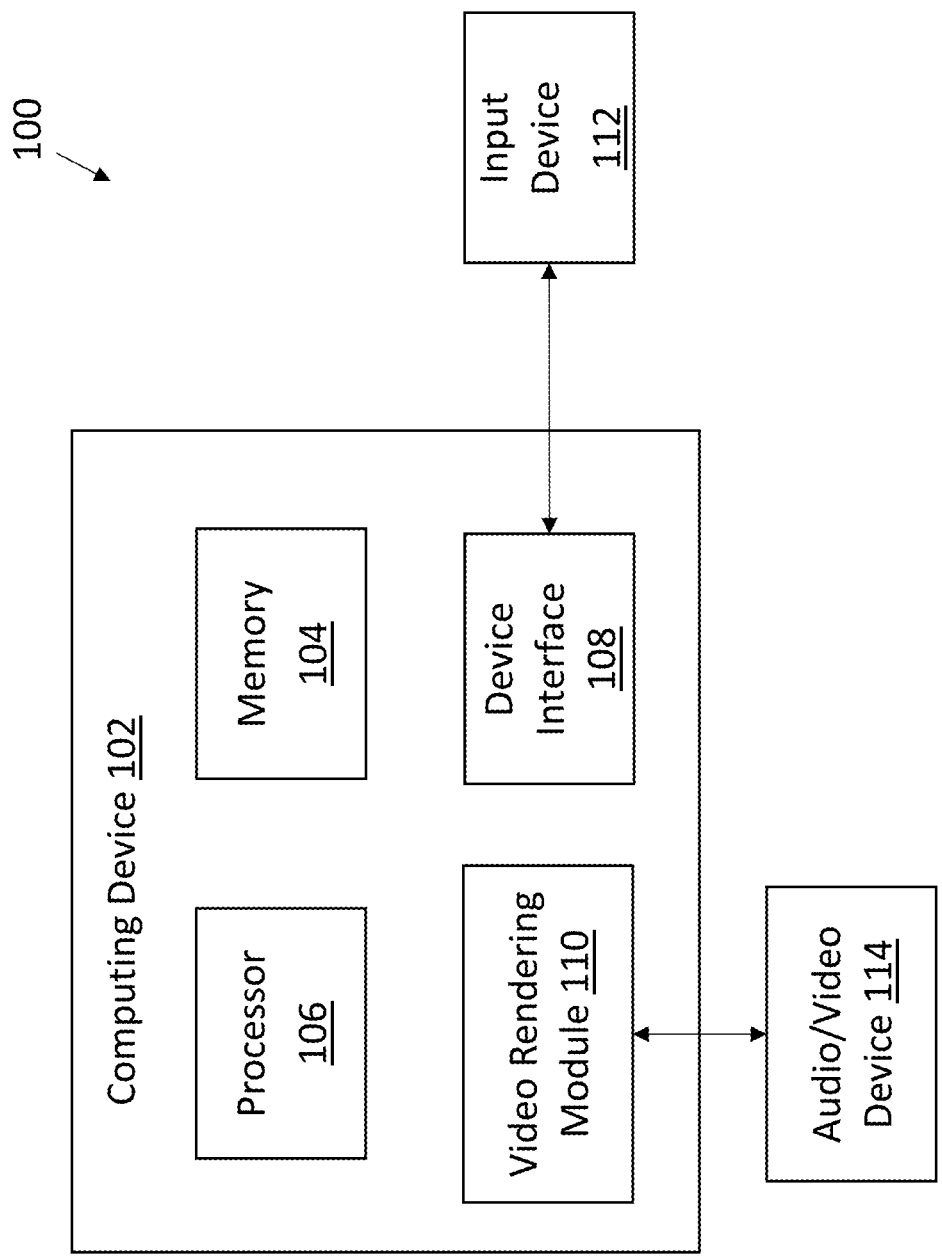
FIG. 1 is a block diagram of a video game platform, according to some embodiments.

The inventor has recognized and appreciated that various aspects of VR video game play, including aspects related to the user's interaction with the platform for games that involve user movement, can result in a poor game experience. For example, for VR activities like walking in place, running in place, high knees, and/or other types of physical movement, the user may physically drift during game play. For example, when a user is wearing a VR headset, the user has a reduced sense of their real-world environment and can therefore unintentionally drift while playing the game (e.g., physically drift forwards, backwards, and/or the like). If the user drifts enough, the user can unintentionally bump into objects in the environment, such as walls, a desk, other furniture, etc.

Some conventional VR systems display an in-game wall when a user gets too close to borders around the play area. For example, if a user gets too close to the edge of a user-specified border, a mesh grid can be displayed that is superimposed over the game display or experience. However, there are various deficiencies with such conventional techniques. For example, such techniques only display the in-game wall when the user is close to the border, and therefore the in-game wall appears abruptly without warning. As a result, the in-game wall may not be displayed quickly enough to prevent a user from bumping into an object. Therefore, users may still look at the ground during game play to avoid physically drifting, which can significantly impact the user's in-game experience. As another example, such conventional techniques can be very disruptive to game play. Since the in-game wall is displayed without warning, it can destroy a user's immersion in the VR experience (e.g., since a user may feel that they need to react immediately to the displayed in-game wall) and/or disorient the user.

The techniques described herein provide improvements to existing video game technology that can enhance the user's VR gaming experience. According to some embodiments, one or more objects can be displayed in the VR experience to help anchor a user during game play. Such object(s) can be displayed for a large portion of game play, and/or continuously during game play. For example, in some embodiments the techniques include displaying a pair of pylons to the user's left and right to help anchor the user to a physical location in the room during game play (e.g., using their periphery). According to some embodiments, an indicator can be displayed to indicate varying degrees of the user's proximity to an object. Therefore, rather than abruptly displaying a wall when the user is dangerously close to a border, the techniques can display and/or update an in-game virtual boundary that provides information to the user of how close the user is to one or more borders and/or boundaries (e.g., determined based on approximate locations of aspects of the physical scene around the user). For example, a dynamic virtual rope, as explained further herein, can appear with varying degrees of coloring that indicate how far the user is drifting in a particular direction.

In some embodiments, the techniques provide for receiving first data indicative of a user position while the user is playing a video game (e.g., a VR game). The techniques include determining whether the user position is within a warning zone that comprises an area between a soft boundary indicative of a safe area for the user (e.g., such that when the user is beyond/in the soft boundary, safe game play can occur), and a safe boundary indicative of one or more real-world objects around the user (e.g., such that if the user is beyond/in the safe boundary, safe game play can still occur although the user may be prompted with warnings that the user is approaching the safe boundary). The techniques include determining, based on a relationship (e.g., distance) between the user position and the safe boundary (e.g., to determine how far into the warning zone the user is, and or whether the user has moved beyond the warning zone and thus beyond the safe boundary), a visual indication of a plurality of visual indications of the in-game virtual boundary to provide to the user. The techniques include transmitting second data indicative of the visual indication to a display being viewed by the user while playing the video game.

In some embodiments, the safe boundary and the soft boundary can be used to provide a layered warning system during game play by tracking the user's position with respect to the soft boundary and the safe boundary. In some embodiments, the safe boundary is configured based on an approximate distance (e.g., two or three feet) from a physical barrier and/or other dangerous aspects of the user's physical environment during game play (e.g., a wall, furniture, etc.). Therefore, the safe boundary can be used to determine when the user's tracked position indicates the user may imminently contact the physical environment without correction. If the user's position moves outside of the safe boundary such that the user is between the safe boundary and the approximate locations of the physical environment), the system can be configured to provide obtrusive and/or extreme warnings to try and have the user quickly correct their position (e.g., to avoid injury during game play). The soft boundary can be configured based on an approximate distance within the safe boundary and/or a second approximate distance from the aspects of the user's physical environment (that is greater than the first approximate distance), such that the soft boundary is further from the physical boundary than the safe boundary and provides a second warning zone between the safe boundary and the soft boundary. Therefore, a user can enjoy safe game play while their tracked position is in the warning zone between the soft boundary and the safe boundary, although a user may be at an increased chance of unsafe game play without correction (e.g., compared to being within the soft boundary area), especially as the user's position moves closer to the safe boundary. Therefore, when a user's position enters the warning zone between the soft boundary and the safe boundary, the system can be configured to provide warnings (e.g., an initial set of warnings) that are less intrusive than those that may be provided once the user's position passes through the safe boundary. As a result, the techniques include monitoring the user's position with respect to the warning zone (and therefore with respect to the soft boundary and the safe boundary) in order to provide layered warnings to the user.

By monitoring the user's position with respect to the warning zone (and thus with respect to the soft boundary and the safe boundary), the techniques described herein can provide various improvements to a user's VR experience over conventional techniques. In particular, the techniques can provide a layered warning system such that while the user's tracked position is within the warning zone, the techniques can provide warnings (e.g., a first set of warnings) that are less disruptive to a user's experience than conventional techniques. For example, as described herein when the user's tracked position is within the warning zone, the user can still safely play the game. Therefore, the visual cues can be configured such that the cues are soft prompts to the user that are perceived by the user but do not dominate the user's vision and/or interrupt or impact the user's game play. The techniques can create an intuitive set of cues that a user can learn to react to, without needing to devote significant attention to during play and/or needing to look at the physical environment during game play. The techniques can help users stay anchored in a spot better, which can increase their physical confidence when they are otherwise blind to the real world during a VR experience. The techniques can additionally, or alternatively, provide a gentler interaction with the user, such that the user can adjust their physical position when the user is starting to drift (e.g., when the user is starting to drift out of bounds or too close to a border), rather than forcing the user to quickly react in an emergency situation when it may already be too late. Further, once the user travels too far into the warning zone towards the safe boundary and/or beyond the safe boundary (e.g., and is in an emergency situation), the user can be provided with enhanced warnings (e.g., a second set of warnings that are different from and/or in addition to the first set of warnings) to indicate the user's potential imminent contact with the environment. The enhanced warnings can be designed to be more intrusive to the user to prompt quick correction to avoid potential contact with the physical environment.

Following below are more detailed descriptions of various concepts related to, and embodiments of, techniques for user boundary control. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a block diagram of a platform 100 in accordance with some embodiments. The platform 100 can include a computing device 102. In some embodiments, the computing device 102 can be a dedicated game console, e.g., PLAYSTATION®3, PLAYSTATION®4, PLAYSTATION®5, or PLAYSTATION® VITA manufactured by Sony Computer Entertainment, Inc.; WII™, WII U™, NINTENDO 2DS™, NINTENDO 3DS™, NINTENDO SWITCH™, or NINTENDO SWITCH™ LITE manufactured by Nintendo Co., Ltd.; or XBOX®, XBOX 360®, XBOX ONE®, XBOX® SERIES X, or XBOX® SERIES S manufactured by Microsoft Corp. In some embodiments, the computing device 102 can be a computer configured to run a game platform and/or a virtual reality (VR) platform, such as those provided by PLAYSTATION®, XBOX®, Oculus, HTC, Sony, and/or the like, and discussed further herein. Examples of VR platforms include platforms with one or more spatially tracked controllers that are configured to work with a VR headset, such as the Oculus Rift, Oculus Quest, Oculus Quest 2, HTC Vive, Sony PLAYSTATION® VR, and/or the like. In other embodiments, the computing device 102 can be a general purpose desktop or laptop computer. In other embodiments, the computing device 102 can be a server connected to a computer network. In other embodiments, the computing device 102 can be user equipment. The user equipment can communicate with one or more radio access networks and/or with wired communication networks. The user equipment can be a cellular phone. The user equipment can also be a smartphone providing services such as word processing, web browsing, gaming, and/or the like. The user equipment can also be a tablet computer providing network access and most of the services provided by a smart phone. The user equipment can operate using an operating system such as Symbian OS, iPhone OS, Windows Mobile, Linux, HP WebOS, and Android. The screen might be a touch screen that is used to input data to the mobile device, in which case the screen can be used instead of the full keyboard. The user equipment can also keep global positioning coordinates, spatial positioning information (e.g., roll, pitch, yaw, etc.), profile information, or other location information.

The computing device 102 can include a memory device 104, a processor 106, a video rendering module 108, and a device interface 110. While connections between the components of the computing device 102 are not shown in FIG. 1 for ease of illustration, it should be appreciated that the components can be interconnected in various ways to facilitate communication among the components.

The non-transitory 104 can maintain machine-readable instructions for execution on the processor 106. In some embodiments, the memory 104 can take the form of volatile memory, such as Random Access Memory (RAM) or cache memory. In other embodiments, the memory 104 can take the form of non-volatile memory, including by way of example semiconductor memory devices, e.g., EPROM, EEPROM, and flash memory devices; or magnetic disks, e.g., internal hard disks or removable disks. In some embodiments, the memory 104 can include portable data storage devices, including, for example, magneto-optical disks, and CD-ROM and DVD-ROM disks.

The processor 106 can take the form of a programmable microprocessor executing machine-readable instructions, such as a computer processing unit (CPU). Alternatively, the processor 106 can be implemented at least in part by special purpose logic circuitry, e.g., an FPGA (field programmable gate array) or an ASIC (application-specific integrated circuit) or other specialized circuit. The processor 106 can include a plurality of processing units, each of which may independently operate on an input data, such as a gradient vector. In some cases, the plurality of processing units may be configured to perform an identical operation on different data. For example, the plurality of processing units can be configured in a single-instruction-multiple-data (SIMD) architecture to operate on multiple data using a single instruction. In other cases, the plurality of processing units may be configured to perform different operations on different data. For example, the plurality of processing units can be configured in a multiple-instruction-multiple-data (MIMD) architecture to operate on multiple data using multiple instructions.

The processor 106 can be coupled with a device interface 108. The device interface 108 can be implemented in hardware to send and receive signals in a variety of mediums, such as optical, copper, and wireless, and in a number of different protocols some of which may be non-transient.

The device interface 108 can be coupled with an external input device 112. The external input device 112 can allow a user to interact with the computing device 102. In some embodiments, the external input device 112 can include a game console controller, a mouse, a keyboard, or any other device that can provide communication with the computing device 102. In some embodiments, the external input device 112 can be one or more spatially tracked controllers that are configured to work with a VR headset, such as the Oculus Rift, Oculus Quest, Oculus Quest 2, HTC Vive, Sony PLAYSTATION® VR, and/or the like as described herein. Examples of such spatially tracked controllers include motion controllers, wired gloves, 3D mice, and/or the like. For example, the spatially tracked controllers can be tracked using optical tracking systems, such as infrared cameras and/or the like.

In some embodiments, the processor 106 can be coupled to a video rendering module 110. The video rendering module 110 can be configured to generate a video display on the external audio/visual device 114 based on instructions from processor 106. While not shown, the computing device 102 can also include a sound synthesizer that can be configured to generate sounds accompanying the video display.

The external audio/visual device 114 can be a video device, an audio device, or an audio/video device, and can include one or more audio and/or video devices. In some embodiments, the one or more audio/video devices can include a display device, e.g., a CRT (cathode ray tube), LCD (liquid crystal display) monitor, or LED (light emitting diode) monitor, a television, an integrated display, e.g., the display of a PLAYSTATION® VITA or Nintendo 3DS, or other type of device capable of displaying video and accompanying audio sounds. In some embodiments, the external audio/visual device 114 is a VR headset as described herein. Such VR headsets can include motion sensing devices, such as gyroscopes and/or other motion sensors that track the user's motion (e.g., the user's head, hand, or body). Such VR headsets can also include display screens. Such VR headsets can also include on board processors that are used to process motion data, display VR video, and perform other aspects of the VR environment.

While FIG. 1 shows one connection into the one or more audio/video devices 114, in other embodiments two or more connections are also possible, such as a connection to a video device and a separate connection to an audio device (e.g., speakers or a headset). In some embodiments, one of the audio/video devices 114 can reside in a first system (e.g., a display system) and another one of the audio/video devices 114 can reside in a second system (e.g., a sound system).

In some embodiments, one or more of the modules 108, 110, and/or other modules not shown in FIG. 1, can be implemented in software using the memory device 104. The software can run on a processor 106 capable of executing computer instructions or computer code. The processor 106 is implemented in hardware using an application specific integrated circuit (ASIC), programmable logic array (PLA), digital signal processor (DSP), field programmable gate array (FPGA), or any other integrated circuit. The processor 106 suitable for the execution of a computer program includes, by way of example, both general and special purpose microprocessors, digital signal processors, and any one or more processors of any kind of digital computer. Generally, the processor 106 receives instructions and data from a read-only memory or a random access memory or both.

In some embodiments, one or more of the modules (e.g., modules 108, 110, and/or other modules) can be implemented in hardware using an ASIC (application-specific integrated circuit), PLA (programmable logic array), DSP (digital signal processor), FPGA (field programmable gate array), or other integrated circuit. In some embodiments, two or more modules can be implemented on the same integrated circuit, such as ASIC, PLA, DSP, or FPGA, thereby forming a system on chip. Subroutines can refer to portions of the computer program and/or the processor/special circuitry that implement one or more functions.

The various modules of the computing device 102 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

While the modules 108 and 110 are depicted as separate modules outside of processor 106 (e.g., as stand-alone graphics cards or sound cards), other embodiments are also possible. For example, one or both modules can be implemented as specialized hardware blocks within processor 106. Alternatively, one or more modules 108 and 110 can be implemented purely as software running within processor 106.

Generally, the techniques described herein provide for an in-game boundary system. The in-game boundary system can provide in-game visual cues that allow the user to safely perform physical movements in place (e.g., running in place, high knees, dancing, etc.). For example, if the user drifts during a VR experience, the in-game boundary system can notify the user with time for the user to safely correct their movements, and do so in a manner that is not obstructive to the user's enjoyment of the VR experience. As described herein, various types of visual cues can be provided to users based on the degree of drift, which can allow a user to play a game and continuously be aware of their movements in the real world without it significantly impacting their play experience.

Figure 2:
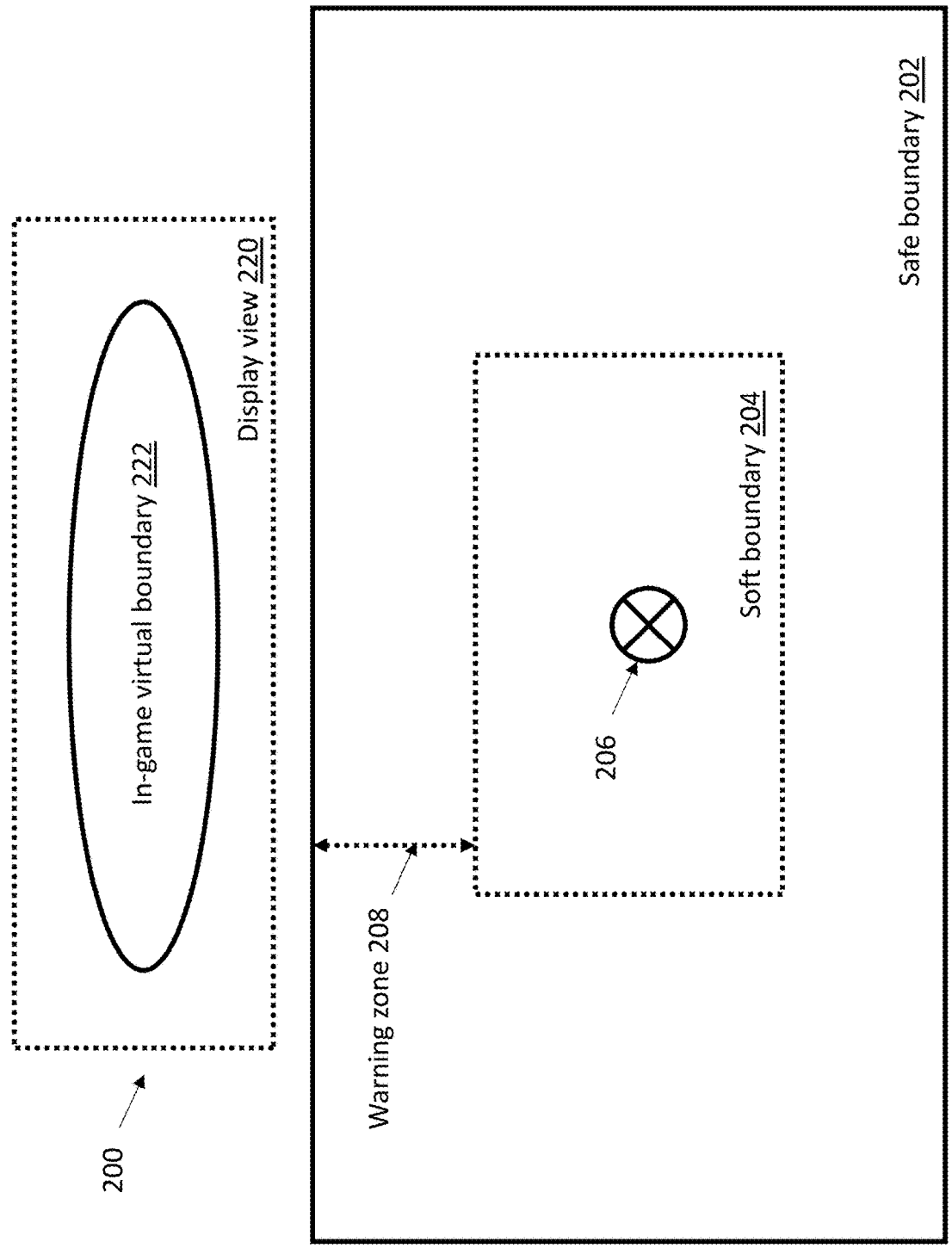
FIG. 2 is a diagram showing an exemplary implementation of an in-game boundary system, according to some embodiments.

FIG. 2 is a diagram 200 showing an exemplary implementation of an in-game boundary system, according to some embodiments. The bottom portion of the diagram 200 shows an exemplary safe boundary 202. The safe boundary 202 is a computer representation based on one or more physical objects around the user, such as one or more walls of a room within which the user is playing a VR game and/or area(s) to avoid during game play (e.g., stairwells, steps, other user-specified locations, etc.). While the safe boundary 202 is shown as a rectangle, it should be appreciated that this is for exemplary purposes only, and the techniques are not limited to specific shapes and/or sizes of the safe boundary 202. For example, other shapes can be used, such as squares, triangles, freeform shapes that encompass a plurality of physical objects (e.g., a shape drawn along a wall with an extension around the outer perimeter of a piece of furniture placed against the wall), and/or the like. As another example, separate components can be used to represent the safe boundary (e.g., an outer boundary for the walls of the room, as well as one or more inner-boundaries to represent objects within the room, such as chairs, desks, and/or other furniture). In some embodiments, the user can configure the aspects of the safe boundary 202 for the VR experience.

In some embodiments, the safe boundary 202 is determined based on a desired distance from the one or more physical objects and/or other area(s) around the user. For example, the safe boundary 202 can be configured to be approximately two feet, three feet, four feet, eighteen inches, thirty-two inches, etc.) from a physical barrier like a wall. In some embodiments, different distances can be used for different portions of the safe boundary 202. For example, if a user's motion is mostly forward or backward during game play, it may be desirable to have a larger distance for the front and back portions of the safe boundary 202, while smaller distances can be used for the sides of the safe boundary 202. In some embodiments, the system configures the distance(s) used for the safe boundary 202 and/or the user can configure the distance(s).

Within the safe boundary 202, there is a soft boundary 204, and the marker 206 shows the tracked position of the user. The soft boundary 204 can be a computer representation of a safe zone during the VR experience, such that while the user's position is within the soft boundary 204, one or more visible aspects of the in-game boundary system are not presented to the user (e.g., the ropes discussed in conjunction with FIGS. 5-6 are not displayed to the user). If the user's tracked position enters the area between the safe boundary 202 and the soft boundary 204, shown as the warning zone 208, the user can be provided with one or more warnings accordingly as described herein (e.g., visual warnings, audible warnings, haptic warnings, etc.).

The safe boundary 202 and the soft boundary 204 can be used to provide a layered warning system to the user during game play. For example, the safe boundary 202 can be used as a reference for where the user may become truly unsafe during game play. Therefore, once the user's position exits beyond the safe boundary 202 (e.g., and is between the safe boundary 202 and the approximate positions of the physical environment), the system can be configured to determine the user is likely subject to unsafe game conditions without immediate correction, and warn the user accordingly (e.g., with intrusive/severe warnings). The soft boundary 204 can be used to provide an additional reference during game play to determine when the user starts to approach dangerous game play (e.g., to determine the user position is getting closer to the safe boundary 202). The system can therefore use the soft boundary 204 to begin to non-intrusively (e.g., softly) warn and/or indicate to the user that the user is approaching the safe boundary 202 with a first set of warnings. Accordingly, in some embodiments, a user may be able to conduct safe game play when in the warning zone 208, such that only once the user's position passes through the safe boundary 202 does the system determine the user may be unsafe (e.g., such that the system can be configured to increase warnings to the user accordingly by making the warnings more severe).

In some embodiments, the soft boundary 204 can be configured based on the safe boundary 202. For example, the soft boundary 204 can largely follow the contour of the safe boundary 202 while being spaced from the safe boundary 202 (e.g., two feet, three feet, etc., from the safe boundary 202). In some embodiments, the soft boundary 204 can include one or more portions that are spaced further from the safe boundary 202 than other portions of the soft boundary 204. For example, if there is a stairwell, a window, a fireplace and/or other objects in the physical scene that a user wishes to remain further away from compared to the rest of the scene, the soft boundary 204 can be configured to provide a further distance as desired. As another example, if the user's direction is primarily in one or more directions, the soft boundary 204 may be spaced further from the safe boundary 202 for those one or more directions.

The top portion of the diagram 200 represents a portion of a user's view 220, such as a portion of a VR headset display. The display includes an in-game virtual boundary 222. In some embodiments, some or all of the in-game virtual boundary 222 can be positioned statically (e.g., for VR experiences where the user only faces in one direction) and/or dynamically, such that the in-game virtual boundary 222 is tracked in front of the player's view (e.g., for VR experiences where the user's viewpoint changes). As described further herein, the in-game virtual boundary 222 can include one or more visual aspects. According to some embodiments, the in-game virtual boundary 222 can include one or more stationary objects that allow a user to monitor their position during the VR experience (e.g., one or more pylons that are displayed during the experience, one or more barriers that are displayed based on the user's proximity to the safe boundary 202, such as a mini-map, one or more representations of object(s) in the physical environment, such as walls, furniture, etc., and/or the like).

In some embodiments, visual aspects of the one or more stationary objects can change based on the user's tracked position, as described further herein, which allows the user to monitor the user's position based on the in-game virtual boundary 222. According to some embodiments, as described further herein one or more aspects (e.g., indicators) of the in-game virtual boundary 222 change based on the user's tracked position 206. The system can monitor the user's tracked movement, such that when the user is within the warning zone 208, the system determines how to present and/or modify the in-game virtual boundary 222, including based on the user's proximity to the soft boundary 204 and/or the safe boundary 202.

Figure 3:
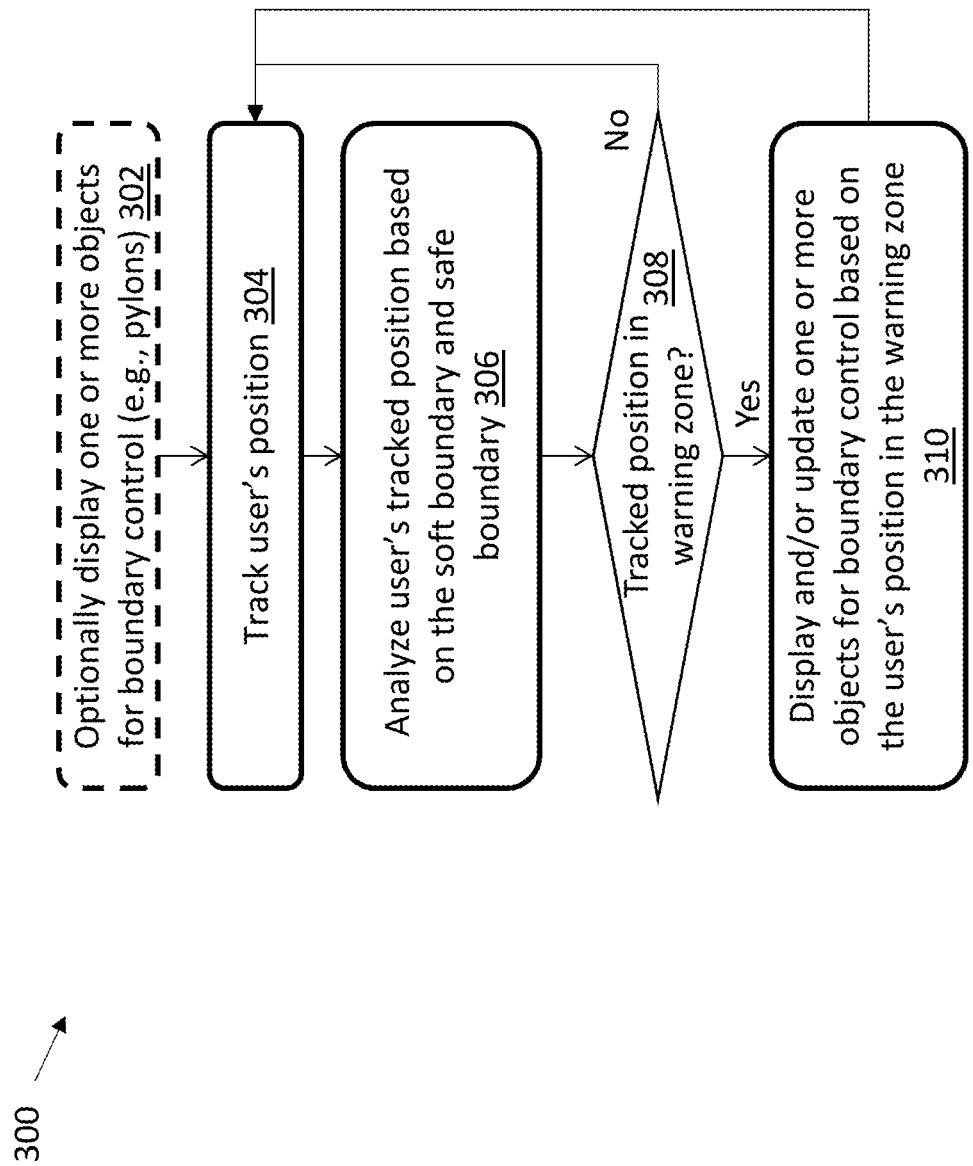
FIG. 3 is a flow chart showing an exemplary computerized method for an in-game boundary system, according to some embodiments.

FIG. 3 is a flow chart showing an exemplary computerized method 300 for providing an in-game boundary system, according to some embodiments. As described herein, the method 300 can be executed by a video game platform, such as by the video game platform 100 described in conjunction with FIG. 1. At step 302, the video game platform optionally displays one or more objects to provide the user with visual guidance in the VR experience. In some embodiments, the video game platform can display the one or more objects at the beginning of game play (e.g., without regard to the user's tracked position). For example, the video game platform can display one or more pylons, such as described further herein in conjunction with FIGS. 5A-6C. However, it should be appreciated that the techniques are not limited to displaying pylons. Other object(s) can be displayed as appropriate to carry out the techniques described herein, including meter(s), arrow(s), and/or any other object(s) that can be used to provide a frame of reference for the user during game play. Further, as described herein, it should be appreciated that the one or more objects can remain in a static position and/or move dynamically, as described herein. As another example, representations of object(s) within the physical environment can be displayed, such as physical objects around the user during game play (e.g., furniture, walls, other players, etc.).

At step 304, the system tracks the user's position to determine and monitor the user's tracked position (e.g., position 206 in FIG. 2). Various aspects of the user can be tracked to track the user's position. For example, the system can track a single point of the user (e.g., the user's head, hand(s), etc.), the average position of multiple points (e.g., head and hands), a plurality of points independently (e.g., different indicators for the user's head and each hand), the most extreme of the plurality of points (e.g., extreme points on the user's head or either hand, depending on which is furthest out of bounds), and/or the like.

At step 306, the system analyzes the user's tracked position based on the soft boundary and the safe boundary.

For example, the system can determine whether the user's tracked position is within the soft boundary and/or within the warning zone between the soft boundary and the safe boundary. In some embodiments, the system can determine a degree of how far the user's tracked position is within the warning zone. For example, the system can determine whether the user just entered the warning zone, whether the user is a certain percentage from the soft boundary to the safe boundary, and/or the like.

At step 308, based on the analyzed data, the system determines whether to modify an aspect of the in-game virtual boundary based on whether the user is in the warning zone. If the user is not in the warning zone, the method 300 proceeds back to step 304 and continues to track the user's position. For example, the system may not modify and/or display one or more indicators when the user's tracked position is within the soft boundary. As another example, if the user's position entered the soft boundary from the warning zone, the system may modify one or more indicators, such as by not displaying the one or more indicators (e.g., where the one or more indicators were previously displayed while the user's tracked position was in the warning zone), changing the one or more indicators to be more transparent than opaque, and/or the like. Therefore, if the user's position is within the soft boundary, the system can maintain or adjust the indicator(s) to visually convey to the user that the current tracked position is sufficient for safe game play (e.g., by not displaying some or all of the visual components of the in-game virtual boundary, and/or changing the display to indicate the user is in a safe position during game play) and/or to allow the user to monitor changes of their tracked position during game play.

If the user's position is in the warning zone, the method proceeds to step 310 and displays and/or updates one or more objects of the in-game boundary system. For example, the system may display one or more visual indicators so that the indicator(s) appear when the user first enters the warning zone from within the soft boundary area. As another example, the in-game virtual boundary can include one or more dynamic aspects that change as the user's tracked position moves further into the warning zone (e.g., as the user's proximity to the safe boundary increases). In some embodiments, one or more objects being displayed can be visually modified to convey a distance between the user position and the safe boundary. For example, additional object(s) can be displayed based on the user's proximity to the safe boundary, meter filling techniques can be used to modify aspects of displayed object(s) to provide additional information on the user's proximity to the safe boundary, the transparency of visual objects can be decreased (e.g., such that the objects gradually become more visible as the user moves further within the warning zone) and/or the like. As an illustrative example not intended to be limiting, as described further in conjunction with FIGS. 5-6 a virtual rope can be displayed once the user enters the warning zone, and as the user's proximity to the safe boundary increases while the user is in the warning zone, the system can modify displayed objects, such as increasing the fill of the virtual rope.

According to some embodiments, if the user is within the warning zone and within a predetermined threshold of the safe boundary (e.g., a danger threshold) and/or has moved outside of the safe boundary, the system can display additional warnings or objects, such as boundary interception points (e.g., warning patterns, representations of objects or walls, and/or the like), and/or take other actions (e.g., playing sound(s), providing haptic feedback, etc.). As a result, the system can modify the in-game virtual boundary as the user travels further into the warning zone and/or outside of the safe zone to increase the warning to the user. It should be appreciated that while examples provided herein are described in the context of visual indicators, the in-game virtual boundary can additionally or alternatively have non-visual components, such as playing sound(s), providing haptic feedback, and/or the like. For example, the techniques can include providing varying levels of haptic feedback and/or sound based on the user's tracked position within the warning zone.

Figure 4:
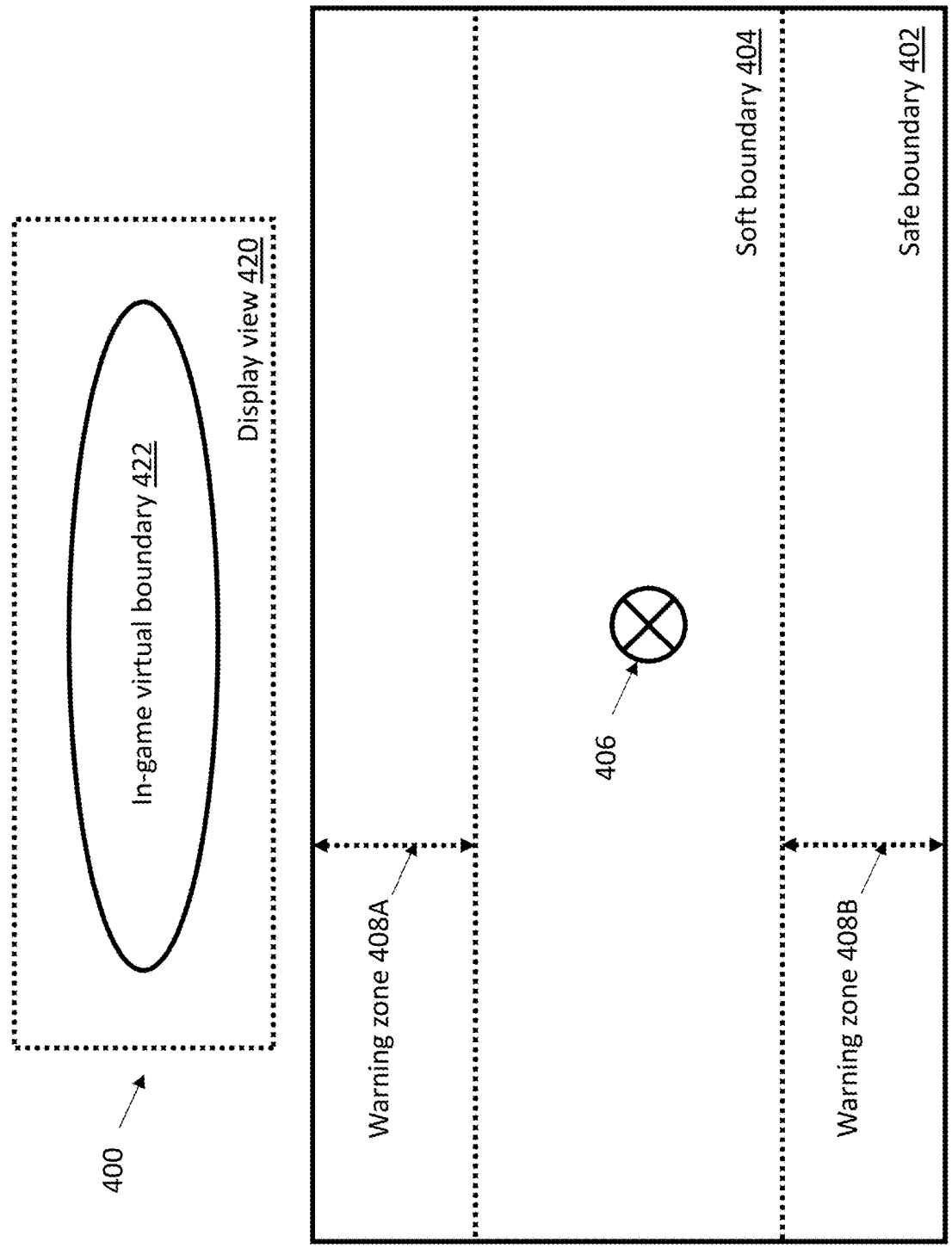
FIG. 4 shows a diagram of a second exemplary embodiment of an in-game boundary system, according to some embodiments.

The soft boundary and/or safe boundary need not fully extend around the user. While the exemplary embodiment discussed in conjunction with FIG. 2 provides a full 360 degree soft boundary and safe boundary, in some embodiments the system can use other types of boundaries and/or boundary configurations. For example, the boundary may only be along one side or some (but not all) sides of the user. FIG. 4 shows a diagram 400 of a second exemplary embodiment of an in-game boundary system, according to some embodiments. Like with FIG. 2, the bottom portion of the diagram 400 shows an exemplary safe boundary 402 and a marker 406 that shows the tracked position of the user. Also like with FIG. 2, the top portion of the diagram 400 represents a portion of the user's view 420, which displays an in-game virtual boundary 422. Within the safe boundary 402, there is a soft boundary 404. The soft boundary 404 is provided such that there are only two warning zones 408A and 408B, one at the user's front and one at the user's back, respectively. Therefore, it should be appreciated that various aspects of the in-game boundary system described herein can be modified and/or adjusted without departing from the spirit of the techniques described herein. For example, it may be desirable to have just a single warning zone 408A or 408B, which may be at the front or back of the user as shown in FIG. 4, and/or at other locations of the user.

It should be further appreciated that while the concepts are described with respect to a safe boundary and a soft boundary, the techniques are not so limited. For example, various position tracking functions and/or mathematical functions can be implemented with the spirit of the techniques described herein to provide a layered warning system. For example, multiple thresholds can be used based on the user's position from the real-world environment to achieve a layered warning system. For example, once a user's position is less than a first threshold distance from an object (e.g., four feet from the object), the system can be configured to provide a soft warning. Once the user's position is less than a second threshold distance from the object (e.g., two feet), the system can be configured to provide enhanced warnings as described herein.

Figure 5A:
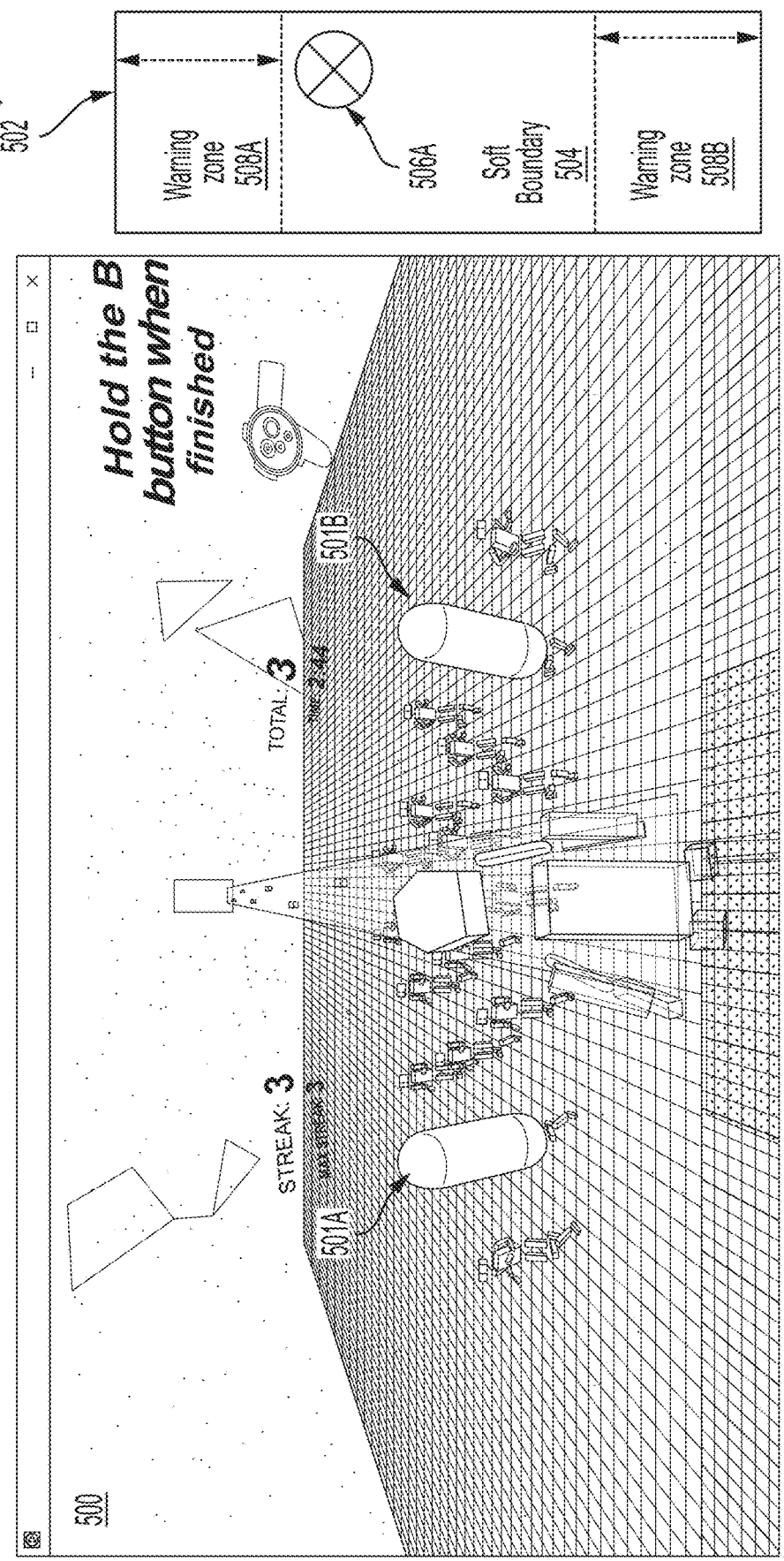
FIGS. 5A-5D, referred to collectively as FIG. 5, show exemplary displays of an in-game boundary system when a user travels through a warning zone in front of the user and then passes outside of a safe boundary, according to some embodiments.

FIGS. 5A-5D show exemplary displays of an in-game boundary system when a user travels through a warning zone in front of the user and then passes outside of a safe boundary, according to some embodiments. FIG. 5A shows a display 500 with two pylons 501A and 501B, located on the respective left and right sides of the user's peripheral view. The two pylons 501A and 501B can be displayed during game play, including when the user is within a soft boundary zone and/or outside of the soft boundary zone and within the danger zone. FIGS. 5A-5D also show an exemplary safe boundary 502 (e.g., which may be configured to be two or three feet from physical objects) and soft boundary 504 (e.g., which may be configured further from the physical objects), the user's tracked position 506 (shown as 506A-506D in FIGS. 5A-5D, respectively), and front and back warning zones 508A and 508B, respectively. As shown, the display 500 can be adjusted based on the user's tracked position 506 within the soft boundary 504, warning zones 508A-508B, and outside of the safe boundary 502.

Figure 5B:
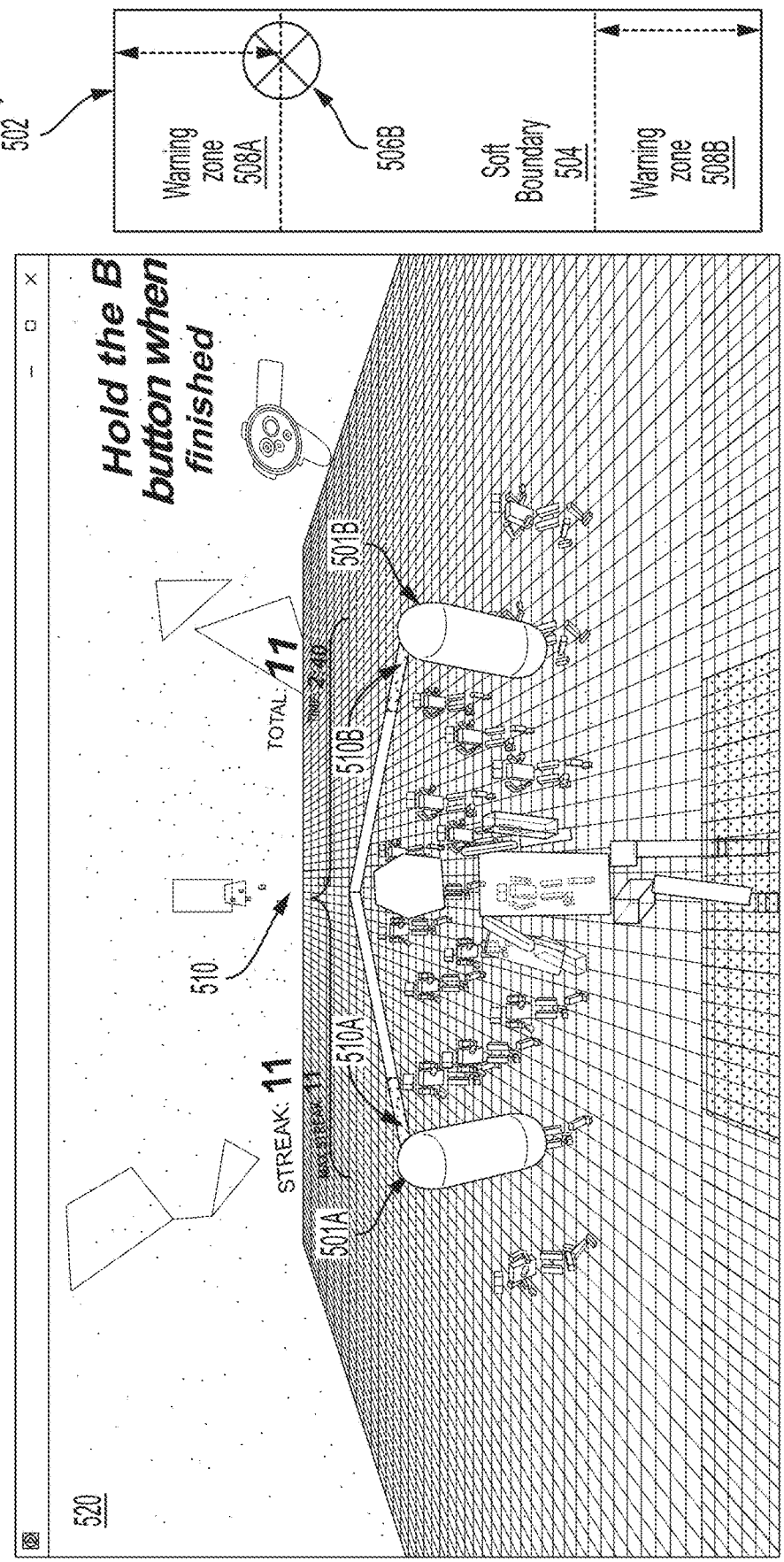

FIG. 5B shows a display 520 with the two pylons 501A and 501B shown in FIG. 5A, as well as a virtual rope 510, according to some embodiments. As shown, the user's tracked position 506B has moved sufficiently close to/within the warning zone 508A to cause display of the virtual rope 510. Since the user's tracked position 506B is still close to the soft boundary 504 and far from the safe boundary 502, the virtual rope 510 only includes small shaded portions 510A and 510B, which can indicate to the user that they are not far from the soft boundary 504.

Figure 5C:
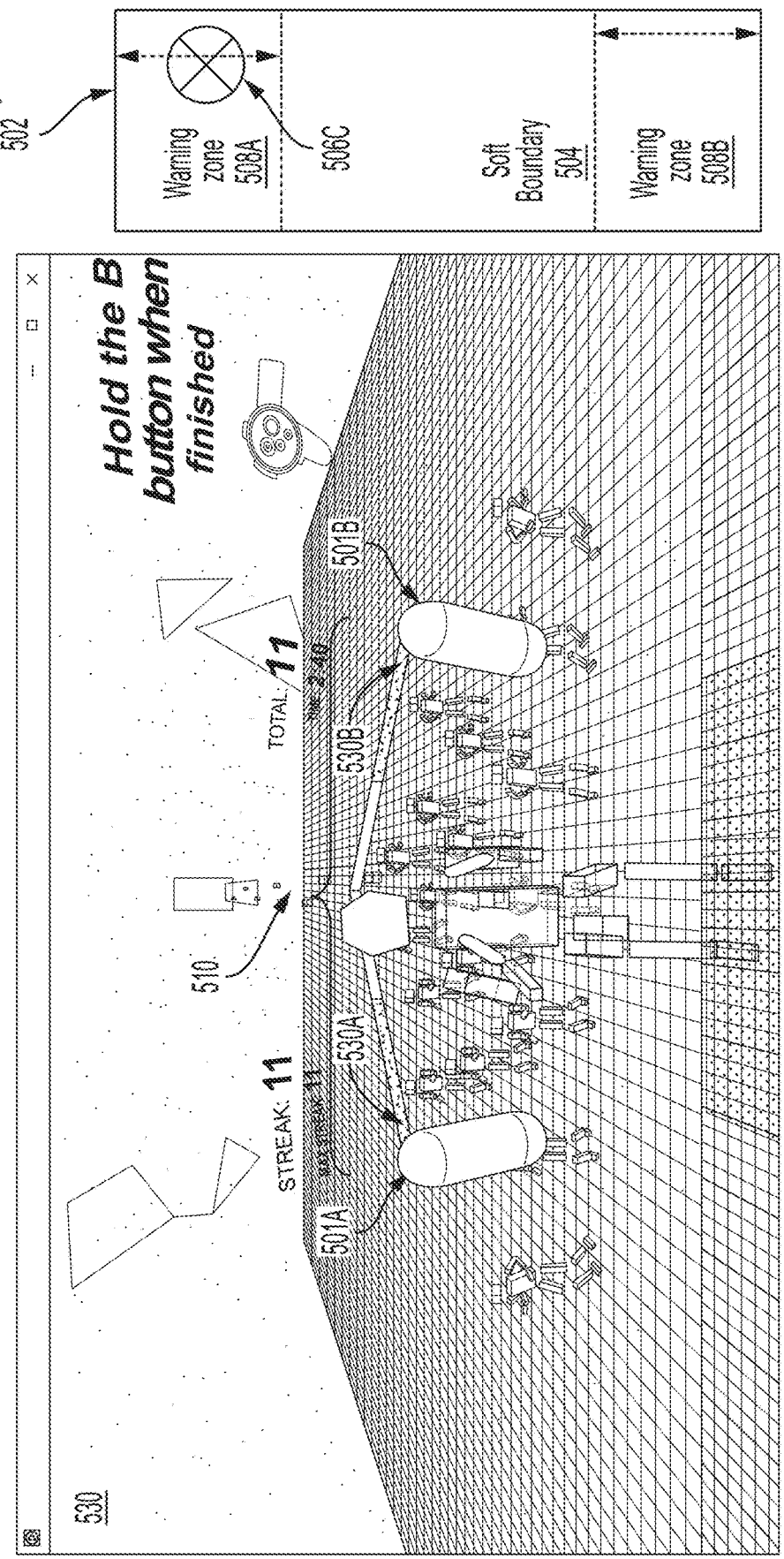

FIG. 5C shows a display 530 with the two pylons 501A and 501B shown in FIG. 5A, as well as the virtual rope 510 shown in FIG. 5B, according to some embodiments. As shown, the user's tracked position 506C has moved further within the warning zone 508A. Because of the user's position within the warning zone 508A, the display 530 includes larger shaded portions of the virtual rope 530A and 530B, which can indicate to the user that the user has moved further into the warning zone 508A.

Figure 5D:
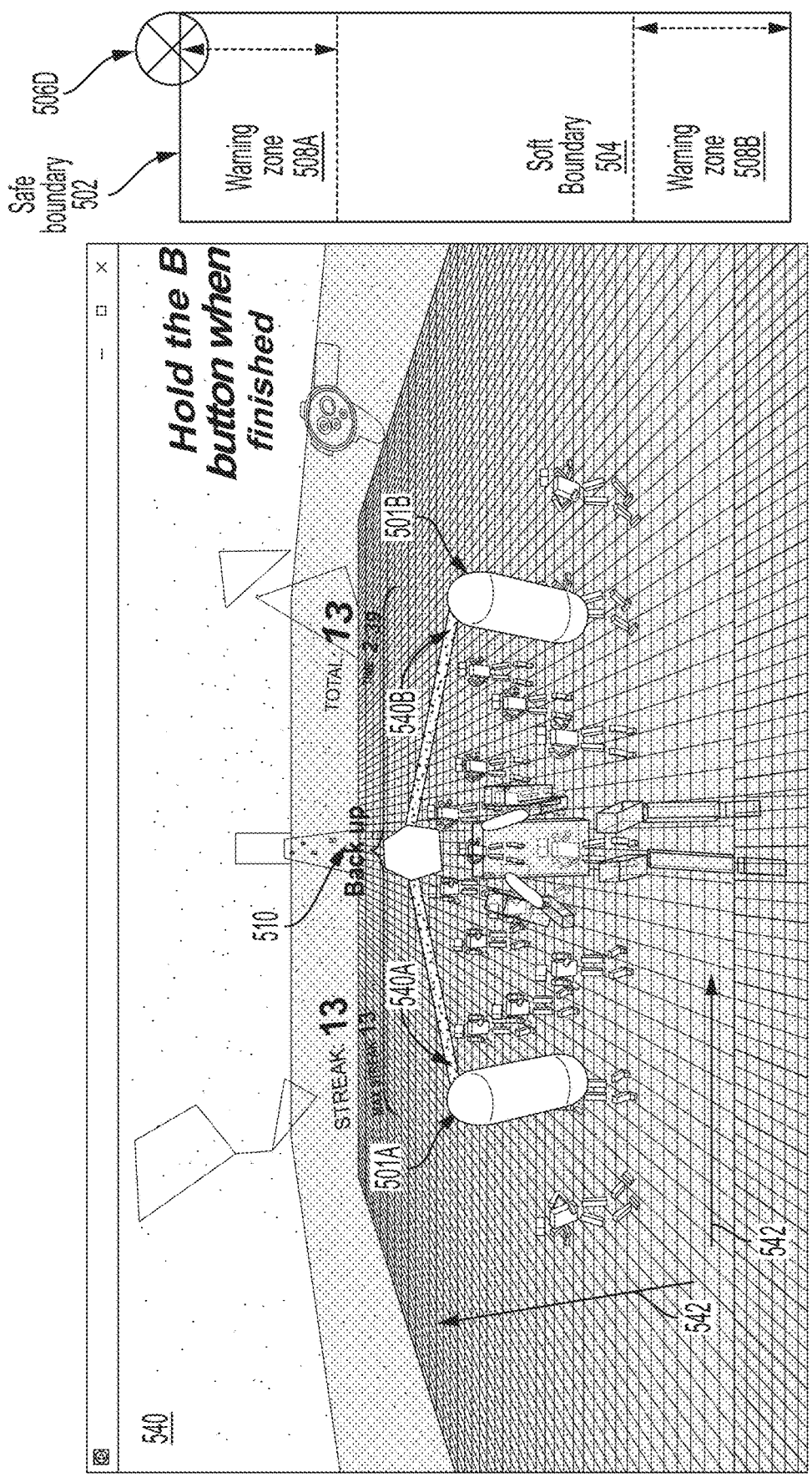

FIG. 5D shows a display 540 with the two pylons 501A and 501B shown in FIG. 5A, as well as the virtual rope 510 shown in FIG. 5B, according to some embodiments. As shown, the user's tracked position 506D has moved through the warning zone 508A and outside of the safe boundary 502. Because the user's position is outside of the warning zone 508A, the display 530 includes even larger shaded portions of the virtual rope 540A and 540B, which can indicate to the user that the user is now quite close to the physical environment. Additionally, in this example, since the user's position is now outside of the safe boundary 502, the system presents a semi-transparent pattern 542 on the display 540 to indicate that the user should pay particularly close attention to their physical position (e.g., to avoid bumping into physical objects).

Figure 6A:
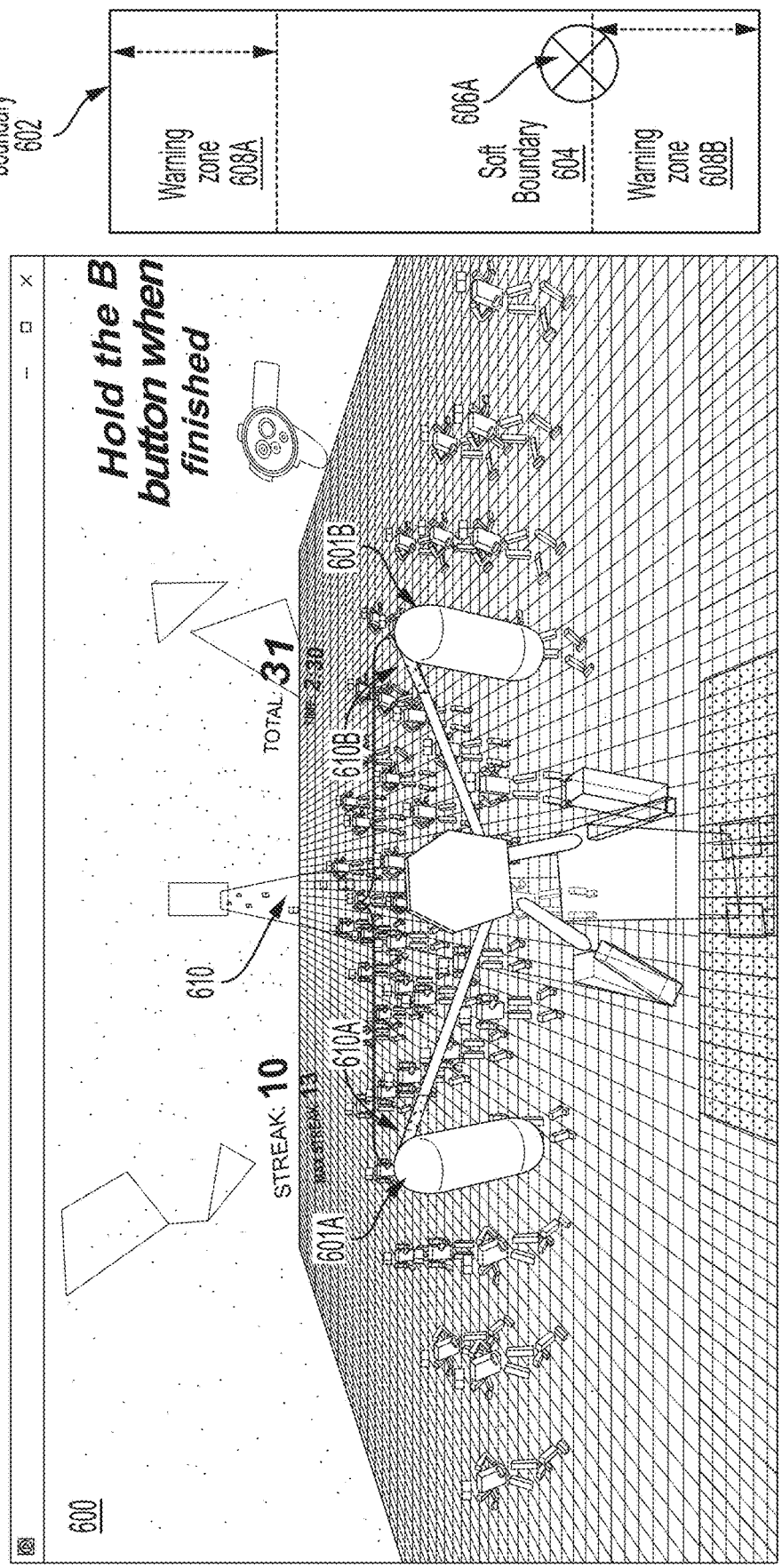
FIGS. 6A-6C, referred to collectively as FIG. 6, show exemplary displays of an in-game boundary system when a user travels through a warning zone behind the user and ultimately moves outside of the safe boundary, according to some embodiments.
Figure 6B:
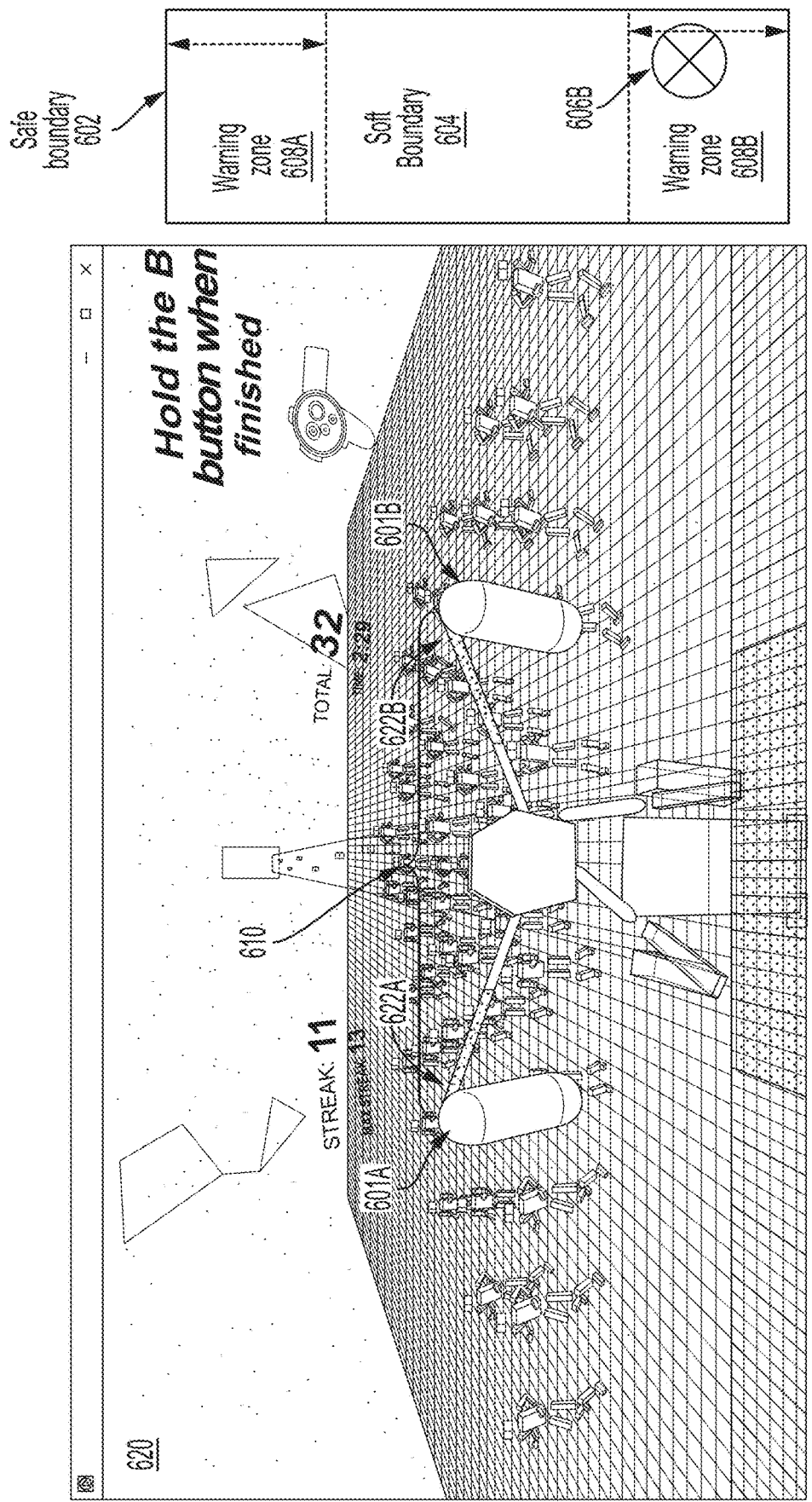
Figure 6C:
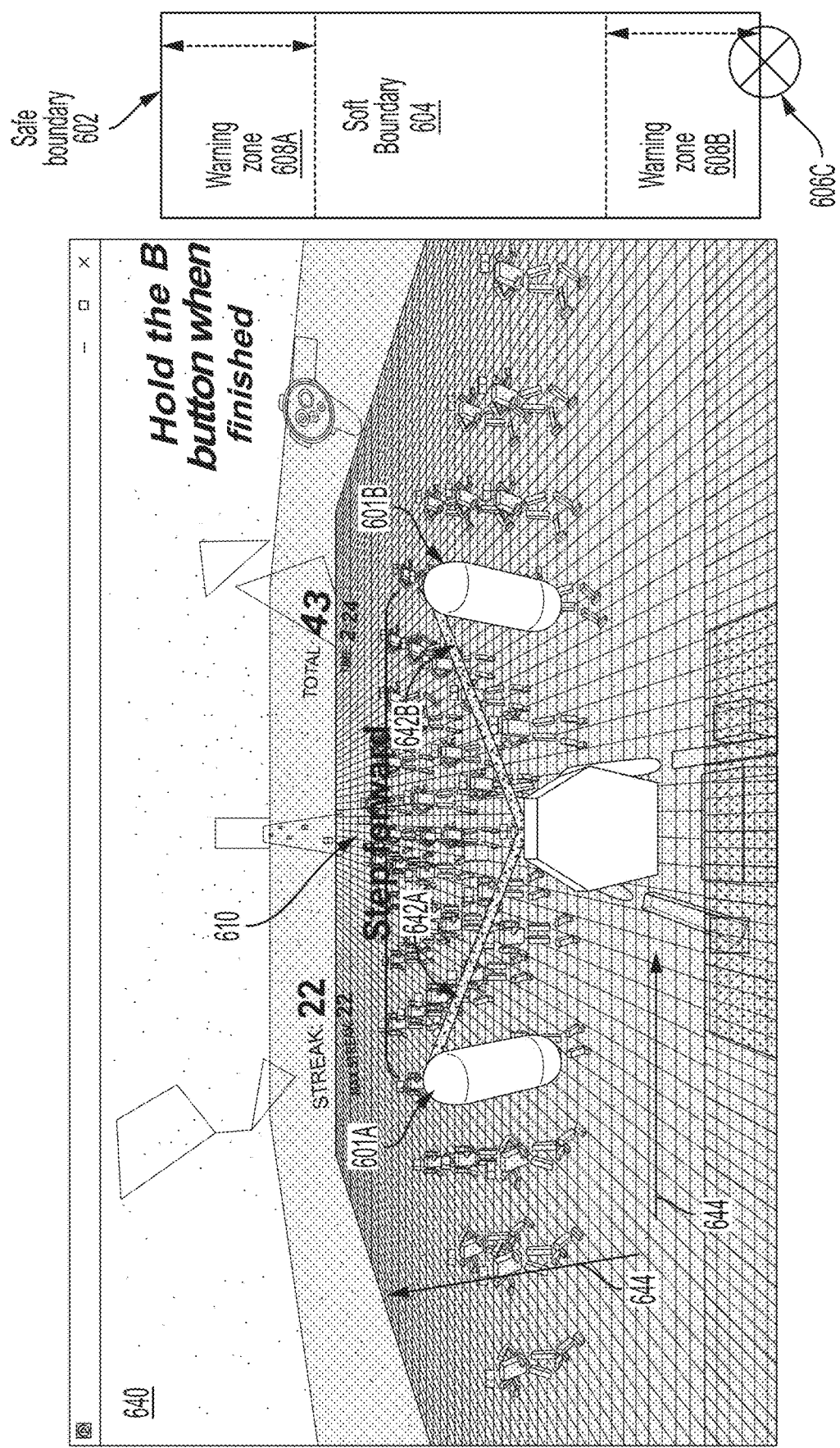

FIGS. 6A-6C show exemplary displays of an in-game boundary system when a user travels through a warning zone behind the user and ultimately moves outside of the safe boundary, according to some embodiments. FIG. 6A shows a display 600 with two pylons 601A and 601B, located on the respective left and right sides of the user's peripheral view. The two pylons 601A and 601B can be displayed during game play, including when the user is within a soft boundary zone and/or outside of the soft boundary zone and within the danger zone. FIGS. 6A-6C also show an exemplary safe boundary 602 and soft boundary 604, the user's tracked position 606 (shown as 606A-606C in FIGS. 6A-6C, respectively), and front and back warning zones 608A and 608B, respectively. As shown in FIG. 6A, the user's tracked position 606A is sufficiently close to/within the warning zone 608B to cause display of the virtual rope 610. Since the user's tracked position 606A is still close to the soft boundary 604 and far from the safe boundary 602, the virtual rope 610 only includes small shaded portions 610A and 610B, which can indicate to the user that they are not far from the soft boundary 604.

FIG. 6B shows a display 620 with the two pylons 601A and 601B and the virtual rope 610 shown in FIG. 6A, according to some embodiments. As shown, the user's tracked position 606B has moved further within the warning zone 608B. Because of the user's position within the warning zone 608B, the display 620 includes larger shaded portions of the virtual rope 622A and 622B, which can indicate to the user that the user has moved further into the warning zone 608B.

FIG. 6C shows a display 640 with the two pylons 601A and 601B and the virtual rope 610 shown in FIG. 6A, according to some embodiments. As shown, the user's tracked position 606C has moved through the warning zone 608B and outside of the safe boundary 602. Because of the user's position outside of the safe boundary 602, the display 640 includes even larger shaded portions of the virtual rope 642A and 642B, which can indicate to the user that the user is now quite close to physical object(s) around the user. Additionally, in this example, since the user's position is outside of the safe boundary 602, the transparent pattern 644 is presented on the display 640 to indicate that the user should pay particularly close attention to their physical position (e.g., to avoid bumping into physical objects).

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein, unless clearly indicated to the contrary, should be understood to mean "at least one." As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

Various aspects are described in this disclosure, which include, but are not limited to, the following aspects:

1. A computer-implemented method for providing an in-game virtual boundary, the method comprising: receiving first data indicative of a user position while the user is playing a video game; determining whether the user position is within a warning zone, wherein the warning zone comprises an area between: a soft boundary indicative of a safe area for the user; and a safe boundary indicative of one or more real-world objects around the user; determining, based on a relationship between the user position and the safe boundary, a visual indication of a plurality of visual indications of the in-game virtual boundary to provide to the user; and transmitting second data indicative of the visual indication to a display being viewed by the user while playing the video game.

2. The method of 1, wherein the video game is a virtual reality (VR) video game, and the display is a VR headset.

3. The method of 1-2, further comprising determining the relationship between the user position and at least a first point of the safe boundary.

4. The method of 1-3, wherein the relationship comprises determining a distance, a velocity, an acceleration, or some combination thereof.

5. The method of 1-4, wherein determining the visual indication comprises determining the visual indication based on: the relationship between the user position and at least a first point of the safe boundary; and a second relationship between the user position and at least a second point of the soft boundary.

6. The method of 1-5, wherein the plurality of visual indications comprises: an object to be displayed to the user; a visual modification of an existing object already being displayed to the user; or some combination thereof.

7. The method of 1-6, further comprising determining the visual modification based on the relationship to visually indicate a degree of a proximity of the user position to the safe boundary.

8. The method of 1-7, wherein the visual modification to the existing object comprises: decreasing a transparency of the existing object; filling a portion of the existing object; or some combination thereof.

9. The method of 1-8, wherein the object or the existing object comprises a pylon, a rope, a text message, a boundary interception point, or some combination thereof.

10. The method of 1-9, wherein the boundary interception point comprises a warning pattern, a representation of an object, a representation of a wall, or some combination thereof.

11. The method of 1-10, further comprising determining a shape of the object, the existing object, or both, based on a direction the user position entered the warning zone from the soft boundary.

12. The method of 1-11, further comprising displaying one or more reference objects during game play regardless of whether the user the user position is within the warning zone, outside of the safe boundary, or both.

13. The method of 1-12, wherein the one or more reference objects comprise a set of pylons.

14. The method of 1-13, further comprising: receiving third data indicative of an updated user position while the user is playing the video game; determining the updated user position is within the soft boundary and not within the warning zone; determining a second visual indication of the plurality of visual indications of the in-game virtual boundary to provide to the user; and transmitting fourth data indicative of the second visual indication to the display being viewed by the user while playing the video game.

15. The method of 1-14, wherein the plurality of visual indications comprises: an object to no longer be displayed to the user; a visual modification of an existing object already being displayed to the user; or some combination thereof.

16. The method of 1-15, wherein the visual modification to the existing object comprises modifying an aspect of the existing object to convey a distance between the user position and the safe boundary.

17. The method of 1-16, wherein modifying the aspect of the existing object comprises: increasing a transparency of the existing object; removing filling of a portion of the existing object; or some combination thereof.

18. The method of 1-17, wherein: the safe boundary is configured based on a first distance from the one or more real-world objects around the user; the soft boundary is configured based on a second distance from the one or more real-world objects around the user, wherein the second distance is greater than the first distance; and determining, based on the relationship between the user position and the safe boundary, the visual indication of the plurality of visual indications comprises: determining the user position is between the safe boundary and the soft boundary; and determining a soft visual warning from the plurality of visual indications; and the method further comprises: determining the user position is outside the safe boundary; determining a second visual warning from the plurality of visual indications that is more severe than the first visual warning; and transmitting third data indicative of the second visual warning to the display being viewed by the user while playing the video game.

19. A non-transitory computer-readable media comprising instructions that, when executed by one or more processors on a computing device, are operable to cause the one or more processors to perform: receiving first data indicative of a user position while the user is playing a video game; determining whether the user position is within a warning zone, wherein the warning zone comprises an area between: a soft boundary indicative of a safe area for the user; and a safe boundary indicative of one or more real-world objects around the user; determining, based on a relationship between the user position and the safe boundary, a visual indication of a plurality of visual indications of the in-game virtual boundary to provide to the user; and transmitting second data indicative of the visual indication to a display being viewed by the user while playing the video game.

20. A system comprising a memory storing instructions, and one or more processors configured to execute the instructions to perform: receiving first data indicative of a user position while the user is playing a video game; determining whether the user position is within a warning zone, wherein the warning zone comprises an area between: a soft boundary indicative of a safe area for the user; and a safe boundary indicative of one or more real-world objects around the user; determining, based on a relationship between the user position and the safe boundary, a visual indication of a plurality of visual indications of the in-game virtual boundary to provide to the user; and transmitting second data indicative of the visual indication to a display being viewed by the user while playing the video game.

The invention claimed is:

1. A computer-implemented method for providing an in-game virtual boundary, the method comprising:
receiving first data indicative of a user position while the user is playing a video game;
determining whether the user position is within a warning zone, wherein the warning zone comprises an area between:
a soft boundary indicative of a safe area for the user; and
a safe boundary indicative of one or more real-world objects around the user;
when the user position is determined to be within the warning zone:
determining, based on a relationship between the user position and the safe boundary, a degree to which the user position is within the warning zone;
determining a visual indication of a plurality of visual indications of the in-game virtual boundary to provide to the user, wherein:
the visual indication comprises an in-game object to be displayed to the user; and
determining the visual indication comprises configuring a visual aspect of the object according to the degree to which the user position is within the warning zone; and
transmitting second data indicative of the visual indication to a display being viewed by the user while playing the video game.

2. The method of claim 1, wherein the video game is a virtual reality (VR) video game, and the display is a VR headset.

3. The method of claim 1, further comprising determining the relationship between the user position and at least a first point of the safe boundary.

4. The method of claim 3, wherein determining the visual indication comprises determining the visual indication based on:
the relationship between the user position and at least a first point of the safe boundary; and
a second relationship between the user position and at least a second point of the soft boundary.

5. The method of claim 1, wherein the relationship comprises determining a distance, a velocity, an acceleration, or some combination thereof.

6. The method of claim 1, wherein
the object is an existing object displayed to the user in the video game; and
configuring the visual aspect of the object comprises making a visual modification of the existing object already being displayed to the user.

7. The method of claim 6, further comprising determining the visual modification based on the relationship to visually indicate a degree of a proximity of the user position to the safe boundary.

8. The method of claim 6, wherein the visual modification to the existing object comprises:
decreasing a transparency of the existing object;
filling a portion of the existing object; or some combination thereof.

9. The method of claim 6, wherein the object comprises a pylon, a rope, a text message, a boundary interception point, or some combination thereof.

10. The method of claim 9, wherein the boundary interception point comprises a warning pattern, a representation of another object, a representation of a wall, or some combination thereof.

11. The method of claim 1, further comprising determining a shape of the object or both based on a direction the user position entered the warning zone from the soft boundary.

12. The method of claim 1, further comprising displaying one or more reference objects during game play regardless of whether position is within the warning zone, outside of the safe boundary, or both.

13. The method of claim 12, wherein the one or more reference objects comprise a set of pylons.

14. The method of claim 1, further comprising:
receiving third data indicative of an updated user position while the user is playing the video game;
determining the updated user position is within the soft boundary and not within the warning zone;
determining a second visual indication of the plurality of visual indications of the in-game virtual boundary to provide to the user; and
transmitting fourth data indicative of the second visual indication to the display being viewed by the user while playing the video game.

15. The method of claim 14, wherein the object is an existing object displayed to the user and the plurality of visual indications comprises:
removal of a display of the existing object already being displayed to the user;
a visual modification of the existing object already being displayed to the user; or some combination thereof.

16. The method of claim 15, wherein the visual modification to the existing object comprises modifying an aspect of the existing object to convey a distance between the user position and the safe boundary.

17. The method of claim 16, wherein modifying the aspect of the existing object comprises:
increasing a transparency of the existing object;
removing filling of a portion of the existing object; or some combination thereof.

18. The method of claim 1,
wherein:
the safe boundary is configured based on a first distance from the one or more real-world objects around the user;
the soft boundary is configured based on a second distance from the one or more real-world objects around the user, wherein the second distance is greater than the first distance; and
determining, based on the relationship between the user position and the safe boundary, the visual indication of the plurality of visual indications comprises:
determining the user position is between the safe boundary and the soft boundary; and
determining a first visual warning from the plurality of visual indications; and
the method further comprises:
determining the user position is outside the safe boundary;
determining a second visual warning from the plurality of visual indications that is more severe than the first visual warning; and
transmitting third data indicative of the second visual warning to the display being viewed by the user while playing the video game.

19. A non-transitory computer-readable media comprising instructions that, when executed by one or more processors on a computing device, are operable to cause the one or more processors to perform:
receiving first data indicative of a user position while the user is playing a video game;
determining whether the user position is within a warning zone, wherein the warning zone comprises an area between:
a soft boundary indicative of a safe area for the user; and
a safe boundary indicative of one or more real-world objects around the user;
when the user position is determined to be within the warning zone:
determining, based on a relationship between the user position and the safe boundary, a degree to which the user position is within the warning zone;
determining a visual indication of a plurality of visual indications of the in-game virtual boundary to provide to the user, wherein:
the visual indication comprises an in-game object to be displayed to the user; and
determining the visual indication comprises configuring a visual aspect of the object according to the degree to which the user position is within the warning zone; and
transmitting second data indicative of the visual indication to a display being viewed by the user while playing the video game.

20. A system comprising a memory storing instructions, and one or more processors configured to execute the instructions to perform:
receiving first data indicative of a user position while the user is playing a video game;
determining whether the user position is within a warning zone, wherein the warning zone comprises an area between:
a soft boundary indicative of a safe area for the user; and
a safe boundary indicative of one or more real-world objects around the user;
when the user position is determined to be within the warning zone:
determining, based on a relationship between the user position and the safe boundary, a degree to which the user position is within the warning zone;
determining a visual indication of a plurality of visual indications of the in-game virtual boundary to provide to the user, wherein:
the visual indication comprises an in-game object to be displayed to the user; and
determining the visual indication comprises configuring a visual aspect of the object according to the degree to which the user position is within the warning zone;
transmitting second data indicative of the visual indication to a display being viewed by the user while playing the video game.

* * * * *

UNITED STATES PATENT AND TRADEMARK OFFICE
CERTIFICATE OF CORRECTION

PATENT NO. : 11,602,691 B2
APPLICATION NO. : 17/198513
DATED : March 14, 2023
INVENTOR(S) : Ryan William Challinor It is certified that error appears in the above-identified patent and that said Letters Patent is hereby corrected as shown below:

In the Claims

Column 18, Claim 6, Line 46, "The method of claim 1, wherein" should read --The method of claim 1, wherein:--.

Column 19, Claim 11, Lines 1-2, "The method of claim 1, further comprising a shape of the object or both based" should read --The method of claim 1, further comprising a shape of the object based--.

Column 19, Claim 12, Line 6, "of whether position is within" should read --of whether the user position is within--.

Signed and Sealed this
Twenty-fifth Day of April, 2023

Katherine Kelly Vidal
*Director of the United States Patent and Trademark Office*